US008301524B2

(12) United States Patent
Fukata

(10) Patent No.: US 8,301,524 B2
(45) Date of Patent: Oct. 30, 2012

(54) ACCOUNTING APPARATUS, ACCOUNTING METHOD AND COMPUTER-READABLE RECORDING MEDIUM FOR RECORDING ACCOUNTING PROGRAM CODES

(75) Inventor: Takuya Fukata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 160 days.

(21) Appl. No.: 12/780,219

(22) Filed: May 14, 2010

(65) Prior Publication Data

US 2010/0306093 A1 Dec. 2, 2010

(30) Foreign Application Priority Data

May 29, 2009 (JP) ................................ 2009-131340

(51) Int. Cl.
*G07F 19/00* (2006.01)
*H04M 15/00* (2006.01)
*G06Q 30/00* (2006.01)
*G06F 17/00* (2006.01)
*G07B 17/02* (2006.01)

(52) U.S. Cl. .......................... 705/34; 705/14.1; 705/402

(58) Field of Classification Search .................... 37/348; 194/350; 705/400, 41, 34, 14.1
See application file for complete search history.

(56) References Cited

U.S. PATENT DOCUMENTS

| | | | | |
|---|---|---|---|---|
| 6,061,668 | A * | 5/2000 | Sharrow | 705/400 |
| 7,580,889 | B2 * | 8/2009 | Suzuki et al. | 705/41 |
| 2003/0110667 | A1 * | 6/2003 | Adachi et al. | 37/348 |
| 2005/0065894 | A1 * | 3/2005 | Inaba | 705/400 |
| 2009/0120761 | A1 * | 5/2009 | Bashor et al. | 194/350 |

FOREIGN PATENT DOCUMENTS

| | | |
|---|---|---|
| JP | 09-297510 | 11/1997 |
| JP | 2002-312148 | 10/2002 |
| JP | 2008-185640 | 8/2008 |

* cited by examiner

*Primary Examiner* — Scott Zare
*Assistant Examiner* — Reva R Danzig
(74) *Attorney, Agent, or Firm* — McDonnell Boehnen Hulbert & Berghoff LLP

(57) ABSTRACT

An accounting apparatus according to an embodiment of the invention includes an accounting unit, an occupancy time counting unit and a charge discounting unit. The accounting unit is configured to impose a charge for use of a device that is an object of accounting on the basis of the number of operations and/or an operation time of the device. The occupancy time counting unit is configured to count an occupancy time that the device has been exclusively used by a user. The charge discounting unit is configured to discount the charge for use of the device on the basis of the occupancy time.

14 Claims, 6 Drawing Sheets

ACCOUNTING APPARATUS, ACCOUNTING METHOD AND COMPUTER-READABLE RECORDING MEDIUM FOR RECORDING ACCOUNTING PROGRAM CODES

INCORPORATION BY REFERENCE

This application is based upon and claims the benefit of priority from the corresponding Japanese Patent Application No. 2009-131340, filed May 29, 2009, the entire contents of which is incorporated herein by reference.

BACKGROUND OF THE INVENTION

1. Field of the Invention

The present invention relates to an accounting apparatus, an accounting method of imposing a charge for use of a device which is an object of accounting (hereinafter, referred to as an accounting object device) and a computer-readable recording medium for recording accounting program codes.

2. Description of the Related Art

It is well known to have a printing system configured to impose a charge for use of an MFP (Multifunctional Peripheral) on the basis of the number of printed sheets of paper (the number of operations) and/or a use time (an operation time) for which the MFP has been used (operated). It is also well known to have a washer system configured to impose a charge for use of a washer on the basis of the number of washing operations (the number of operations) and a dryer system configured to impose a charge for use of a dryer on the basis of a dry time (an operation time).

Each of the above mentioned accounting apparatuses is configured such that when a user inputs money (coins and/or bills) and/or electronic money into the apparatus, a user is permitted to use the device and a charge for use of the device is imposed.

In the MFP, although the operation time for making each copy is almost uniform, an occupancy time that a user exclusively uses the MFP (including a time taken for setting an original to be copied on the MFP and a time taken for taking a copied and printed matter out of the MFP) varies greatly depending on each user who uses the MFP.

If there is a significant occupancy time of an MFP, it may sometimes be the case that people must wait to use the MFP, and hence the use efficiency of the MFP is reduced. Similarly, in the washer or dryer system, a dead time from when washing or drying has been completed to when clothing is taken out of the washer or dryer varies greatly depending on each user who uses the washer or dryer system. The greater the dead time, the more the occupancy time is increased. Thus, it may sometimes be the case that turn waiting is induced and the use efficiencies of the washer and dryer are reduced.

SUMMARY OF THE INVENTION

An accounting apparatus according to an embodiment of the present invention includes an accounting unit, an occupancy time counting unit and a charge discounting unit. The accounting unit is configured to impose a charge for use of a device that is an object of accounting on the basis of the number of operations and/or an operation time of the device. The occupancy time counting unit is configured to count an occupancy time that a user has exclusively used the device. The charge discounting unit is configured to discount the charge for use of the device on the basis of the counted occupancy time.

An accounting method according to an embodiment of the present invention includes (1) an accounting unit imposing a charge for use of a device that is an object of accounting on the basis of the number of operations and/or an operation time of the device, (2) an occupancy time counting unit counting an occupancy time for which the device has been exclusively used by a user and (3) a charge discounting unit discounting the charge on the basis of the counted occupancy time.

A computer-readable recording medium according to an embodiment of the present invention stores accounting program codes to be executed by a computer installed in an accounting apparatus. The accounting program codes include three program codes. The first program code causes the computer to impose a charge for use of a device that is an object of accounting on the basis of the number of operations and/or an operation time of the device. The second program code causes the computer to count an occupancy time that the device has been exclusively used by a user. The third program code causes the computer to discount the charge for use of the device on the basis of the counted occupancy time.

Additional features and advantages are described herein, and will be apparent from the following Detailed Description and the figures.

DESCRIPTION OF THE EMBODIMENT

Next, an embodiment of an accounting apparatus according to the present invention will be described with reference to the accompanying drawings.

Figure 1:
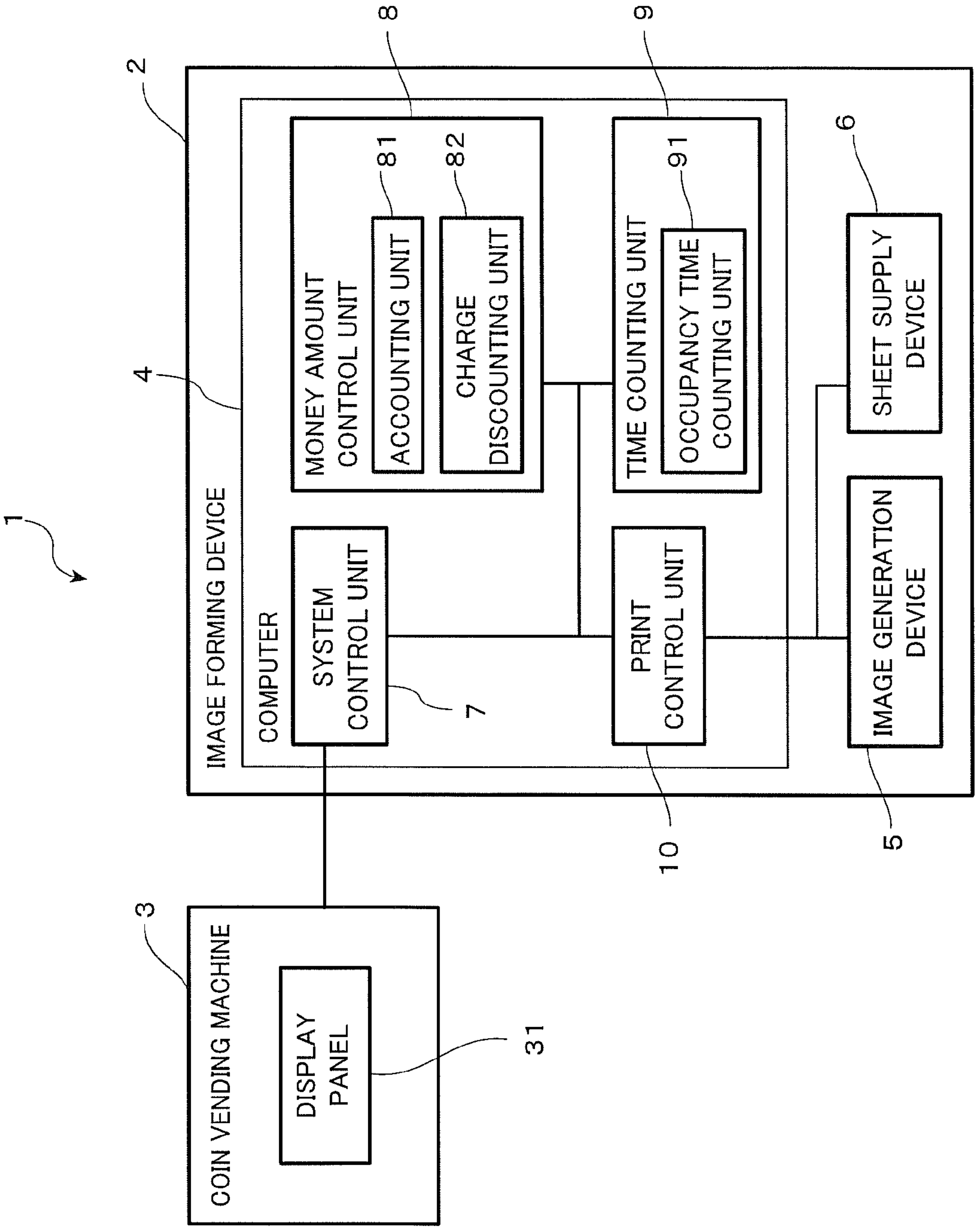
FIG. 1 shows a block diagram illustrating a system configuration of an accounting apparatus according to an embodiment of the present invention.

FIG. 1 shows a block diagram illustrating a system configuration of the accounting apparatus according to one embodiment of the present invention. As illustrated in FIG. 1, image forming device 2 is an accounting object device, and includes computer 4, image generation device 5 and sheet supply device 6.

Figure 6:
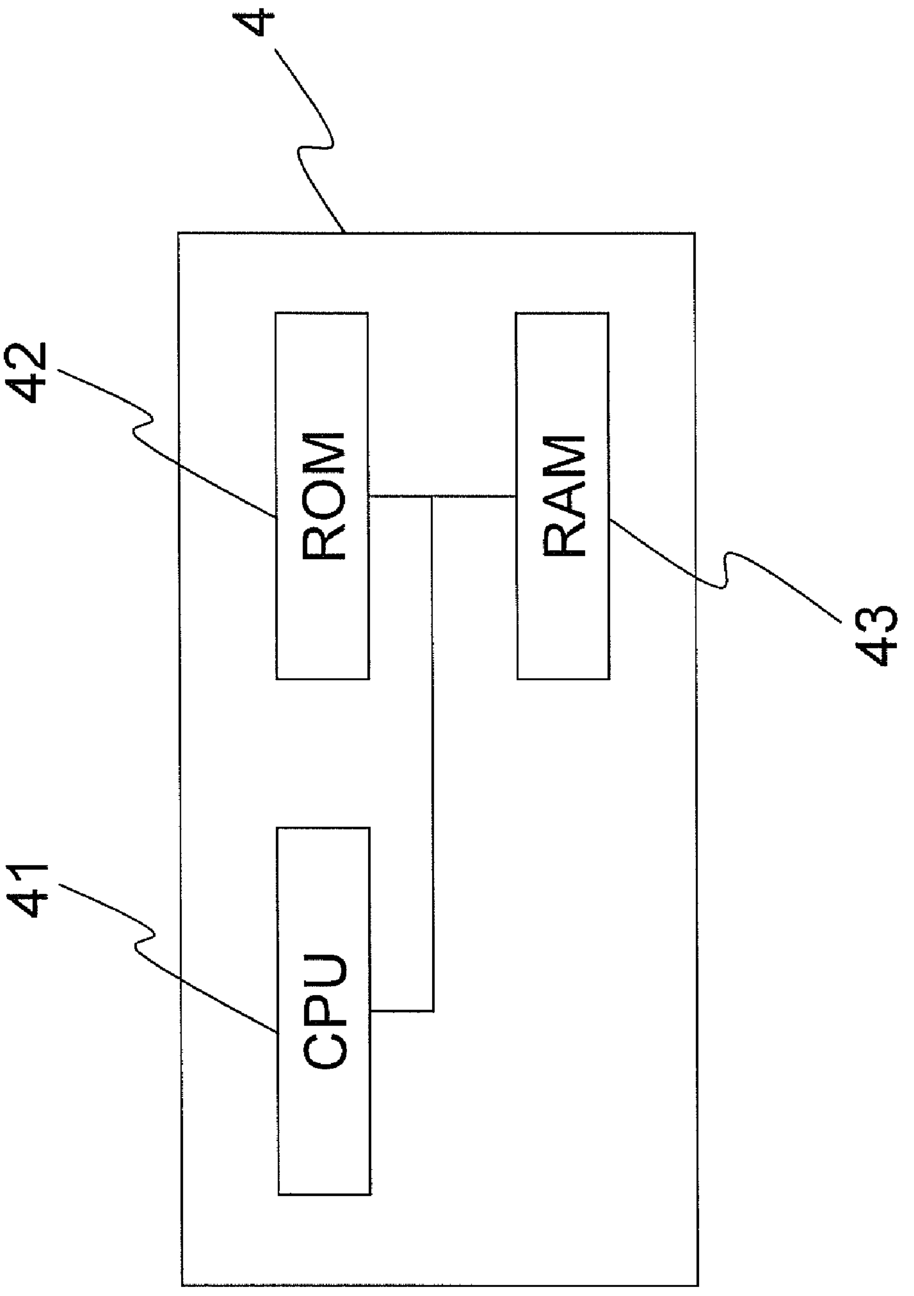
FIG. 6 shows a hardware architecture of a computer according to an embodiment of the present invention.

FIG. 6 shows a hardware architecture of computer 4. As illustrated in FIG. 6, computer 4 includes CPU (Central Processing Unit) 41, ROM (Read Only Memory) 42 and RAM (Random Access Memory) 43. These components operate in cooperation with one another to constitute system control unit 7.

CPU 41 is an arithmetic processing unit that executes a process described in a program. ROM 42 is a nonvolatile memory that stores programs and data. RAM 43 is a memory that temporarily stores a program and data used when the program is to be executed. When CPU 41 executes an accounting program, system control unit 7 configures money amount control unit 8, time counting unit 9 and print control unit 10 as functional entities in the computer.

Money amount control unit 8 includes accounting unit 81 and charge discounting unit 82. Accounting unit 81 is configured to impose a charge for use of image forming device 2 on the basis of the number of operations and/or an operation time of the device. That is, accounting unit 81 sets the charge for use of image forming device 2 on the basis of an accounting rate that has been set in advance. For example, in this embodiment, a charge of 10 cents per copy may be set as the accounting rate.

Accounting unit 81 then calculates an amount of money obtained by multiplying the accounting rate and the number of operations as the charge for use of the device. Therefore, at the accounting rate, accounting unit 81 can charge an accounting amount of (the number of copies)×(10 cents). Accounting unit 81 notifies print control unit 10 of the calculated accounting amount.

Charge discounting unit 82 is configured to subtract an amount of money that is discounted, from the accounting amount calculated using accounting unit 81 (hereinafter, referred to as a discount amount), on the basis of an actual occupancy time that a user has exclusively used image forming device 2. Basically, charge discounting unit 82 compares a standard occupancy time that has been set for the number of operations of image forming device 2 with the actual occupancy time that the user has exclusively used image forming device 2. If the actual occupancy time is shorter than the standard occupancy time, charge discounting unit 82 discounts the charge.

In image forming device 2, for example, the standard occupancy time per copy is set to 1 minute. That is, under the above mentioned condition, the standard occupancy time taken for making 10 copies will be 10 minutes. In this example, a use time of less than 10 minutes to make 10 copies means that an occupancy time for making those 10 copies is shorter than the standard occupancy time for making that many copies. Therefore, in this situation, charge discounting is applicable.

It becomes possible to appropriately discount the charge on the basis of the standard occupancy time and it becomes also possible to give the user an incentive to make copies in less time by configuring the apparatus in the above mentioned manner. Specifically, charge discounting unit 82 calculates a discount amount in proportion to a difference between the standard occupancy time and an actual occupancy time, and subtracts the calculated discount amount from an accounting amount.

For example, it is assumed that the standard occupancy time per copy is 1 minute and a discount rate is set to 1 cent per 10 seconds of a reduction time. Under this assumption, making 10 copies in 9 minutes results in an actual occupancy time that is 60 seconds less as compared with the standard occupancy time (10 minutes). In this situation, charge discounting unit 82 calculates a discount amount (in the example, 6 cents) that changes in proportion to each actual occupancy time for a normal charge (10 cents×10 sheets=100 cents) that has been calculated using accounting unit 81.

The calculated discount amount is transmitted to coin vending machine 3 via system control unit 7, and is returned to the user together with a balance, in response to a returning operation executed using coin vending machine 3.

In the wake of calculation of the discount amount in proportion to the actual occupancy time as described above, the discount amount of the charge is increased as a result of greater reductions of time that the image forming device has been exclusively used. Therefore, it becomes possible to make the user endeavor to reduce the actual occupancy time that he exclusively uses image forming device 2, thereby further increasing the use efficiency of image forming device 2.

Time counting unit 9 includes occupancy time counting unit 91. Occupancy time counting unit 91 is configured to count the time that a user has exclusively used image forming apparatus 2. The counted occupancy time is transmitted to charge discounting unit 82 using time counting unit 9. Specifically, occupancy time counting unit 91 counts the occupancy time from the time that a coin inputting operation is performed by the user to the time that a coin returning operation is performed by the user.

In addition, occupancy time counting unit 91 may subtract, from the occupancy time, a time during which an error has occurred in image forming device 2 (hereinafter, referred to as a error occurrence time). For example, if an error such as a paper jam occurs while a copying operation is being executed, occupancy time counting unit 91 may subtract a time taken from when the error occurred to when the paper jam was eliminated from the occupancy time. Owing to the above mentioned configuration, even if the time that image forming device 2 has been exclusively used is increased due to occurrence of an error or damage that is not a fault of a user, the charge may be discounted on the basis of the substantial occupancy time. Thus, accounting and discounting that are satisfactory to the user may be performed.

Further, occupancy time counting unit 91 may subtract, from the occupancy time, a time taken for execution of a setting operation on image forming device 2. For example, for an operation needed for combine copying (such as a setting operation to make copies of images on two A4-size originals on one A4-size sheet of paper), occupancy time counting unit 9 may subtract a time taken for executing the setting operation (hereinafter, referred to as the setting operation time) from the occupancy time.

Even if the occupancy time is increased due to execution of the setting operation as described above, the charge may be discounted by subtracting a time other than the substantial occupancy time in the above mentioned manner. Thus, accounting and discounting that are satisfactory to the user may be performed.

Print control unit 10 is configured to control the operations of image generation device 5 and sheet supply device 6 to make these devices execute a copying process. Print control unit 10 may count the number of copied sheets of paper and notify accounting unit 81 of the counted value. In addition, print control unit 10 is configured to permit (control) the operation of image generation device 5 within a range that includes the difference (the balance) between the amount of coins that the user has input into the apparatus and the accounting amount transmitted from accounting unit 81.

Image generation device 5 includes an original reader and a print engine that executes a copying process under the control of print control unit 10.

Sheet supply device 6 is configured to supply a sheet of paper to the print engine of image generation device 5. Sheet supply device 6 includes a group of sheet supply cassettes for housing one or more kinds of sheets of different sizes.

Coin vending machine 3 is configured to receive coins or return coins which have been input into the machine. Coin vending machine 3 may notify system control unit 7 of information regarding receiving coins, returning coins, and an amount of money received into the machine. For example, coin vending machine 3 returns the discount amount and the balance transmitted from charge discounting unit 82 in response to a coin returning operation performed by a user.

Coin vending machine 3 also includes display panel 31 serving as a display device. Display panel 31 may display an amount that has been input, the balance, change, a discount amount and various messages depending on the situation (for example, "Input Coins", "Depress Coin Return Button at End of Copy" and "10 cents Discounted").

As described above, accounting apparatus 1 according to an embodiment of the present invention is configured to perform an accounting in response to use of an accounting object device, and includes image forming device 2 (constituting the accounting object device) and coin vending machine 3 into which coins are input and/or from which coins are returned. In particular, in this embodiment, coin vending machine 3 is used to start and/or terminate counting of the occupancy time of image forming device 2 on the basis of a coin inputting operation and/or a balance returning operation performed by the user.

Figure 2:
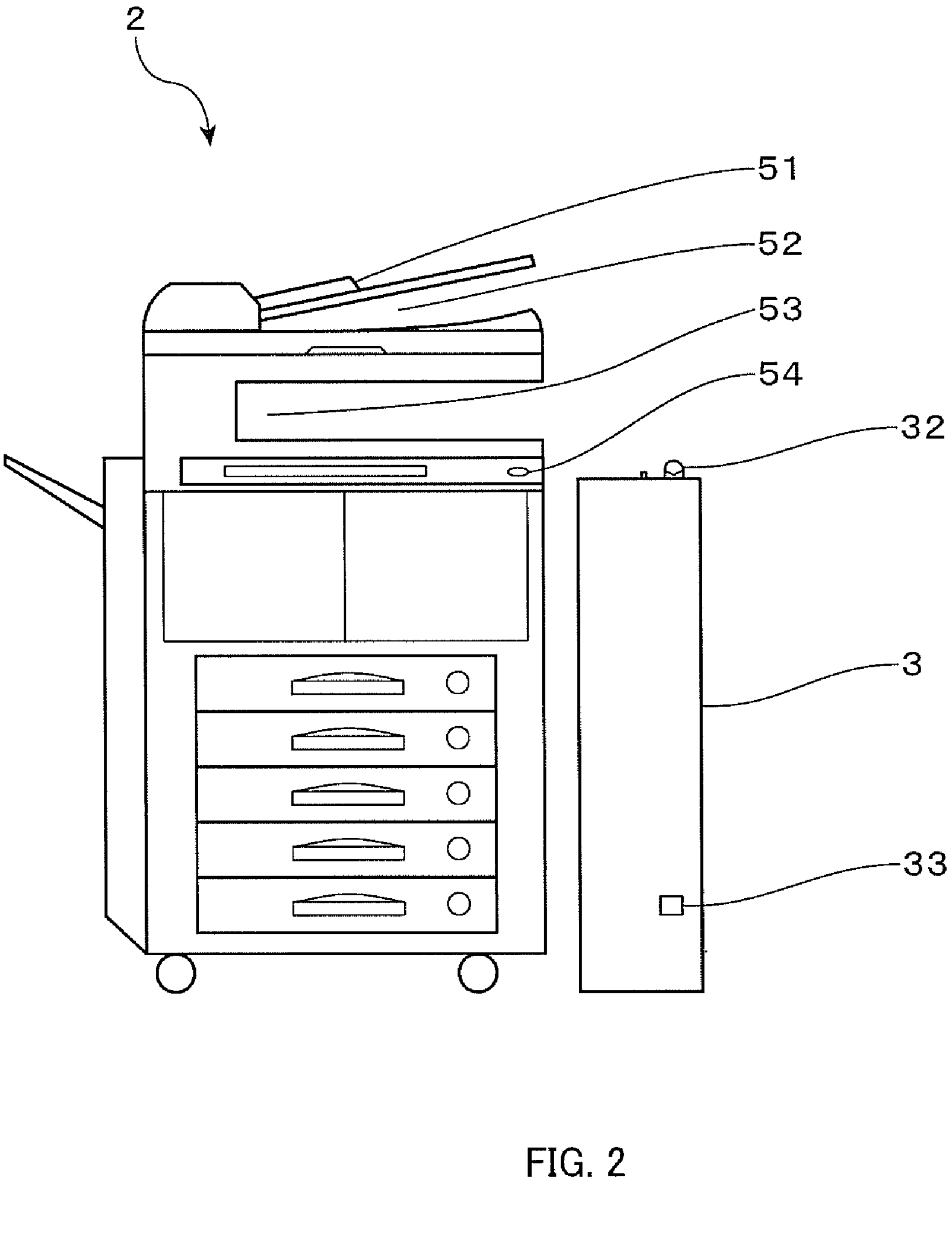
FIG. 2 shows a perspective view illustrating a mechanical configuration of an accounting apparatus according to an embodiment of the present invention.
Figure 3:
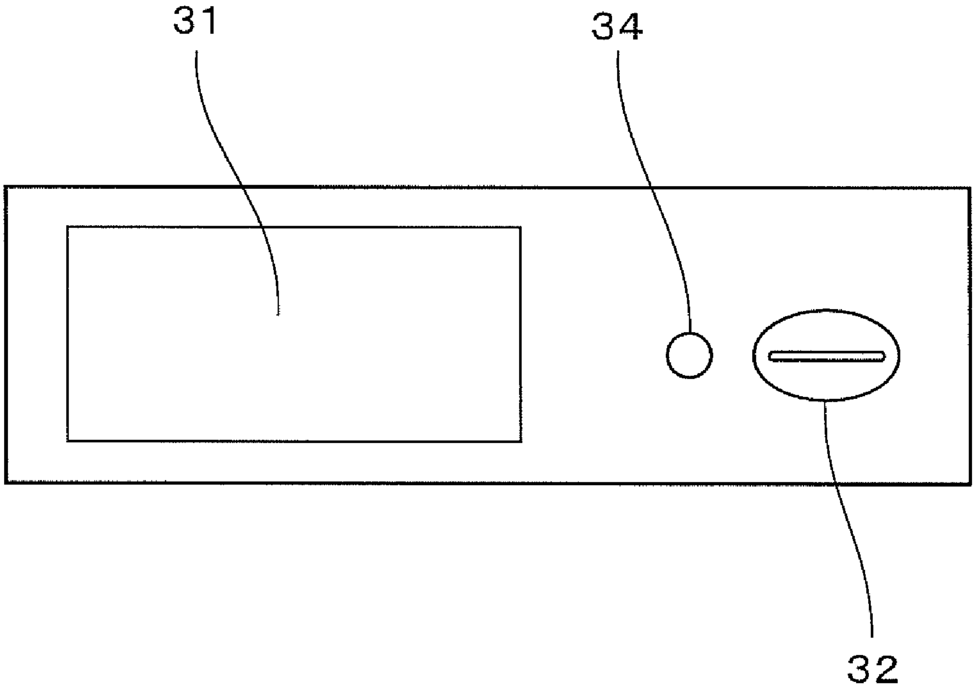
FIG. 3 shows an enlarged diagram illustrating an upper part of a coin vending machine.

Next, a mechanical configuration of the accounting apparatus according to this embodiment, having the system configuration as described above, will be described with reference to FIGS. 2 and 3. FIG. 2 shows a perspective view illustrating a mechanical configuration of the accounting apparatus according to an embodiment of the present invention. FIG. 3 shows an enlarged diagram illustrating an upper part of a coin vending machine.

As illustrated in FIG. 2, image forming device 2 includes original mounting tray 51, original discharge port 52, copied matter discharge port 53 and copy button 54. Copy button 54 is depressed to make image forming device 2 execute the process of making a copy of an image set on original mounting tray 51. Coin vending machine 3 has coin input slot 32 into which coins (money) are input in its upper surface part, and coin return slot 33 from which the balance (change) is returned in its lower front surface part.

As illustrated in FIG. 3, coin vending machine 3 has display panel 31 on its upper surface that displays details of an operation to be executed, and coin return button 34 that, when depressed, returns coins in the vicinity of coin input slot 32.

Image forming device 2 configured as described above is manipulated by a user to be used and operated in the following manner. First, a user who intends to use image forming device 2 inputs coins into coin input slot 32 in coin vending machine 3. Next, the user sets an original on original mounting tray 51 of image forming device 2 and then depresses copy button 54.

When copy button 54 is depressed, image forming device 2 reads an image from the original and discharges the original image to original discharge port 52. Image forming device 2 feeds the image that has been read from the original to the print engine to print the image on a sheet of paper. Image forming device 2 then discharges the printed sheet to the outside through copied matter discharge port 53. In the above mentioned manner, execution of one copying process is completed.

After the copying process has been executed on the required number of sheets of paper, the user depresses coin return button 34 on coin vending machine 3. When coin return button 34 is depressed, coin vending machine 3 returns the discount amount calculated using charge discounting unit 82, and the remaining balance of the money paid (overpayment) for the number of copies through coin return slot 33.

Display panel 31 on coin vending machine 3 displays the input amount of money and the balance. Display panel 31 also displays a discount amount for a time period when coin return button 34 is depressed.

Next, procedures of an accounting process executed using the accounting apparatus will be described with reference to FIGS. 4 and 5, according to an embodiment of the present invention configured as described above.

Figure 4:
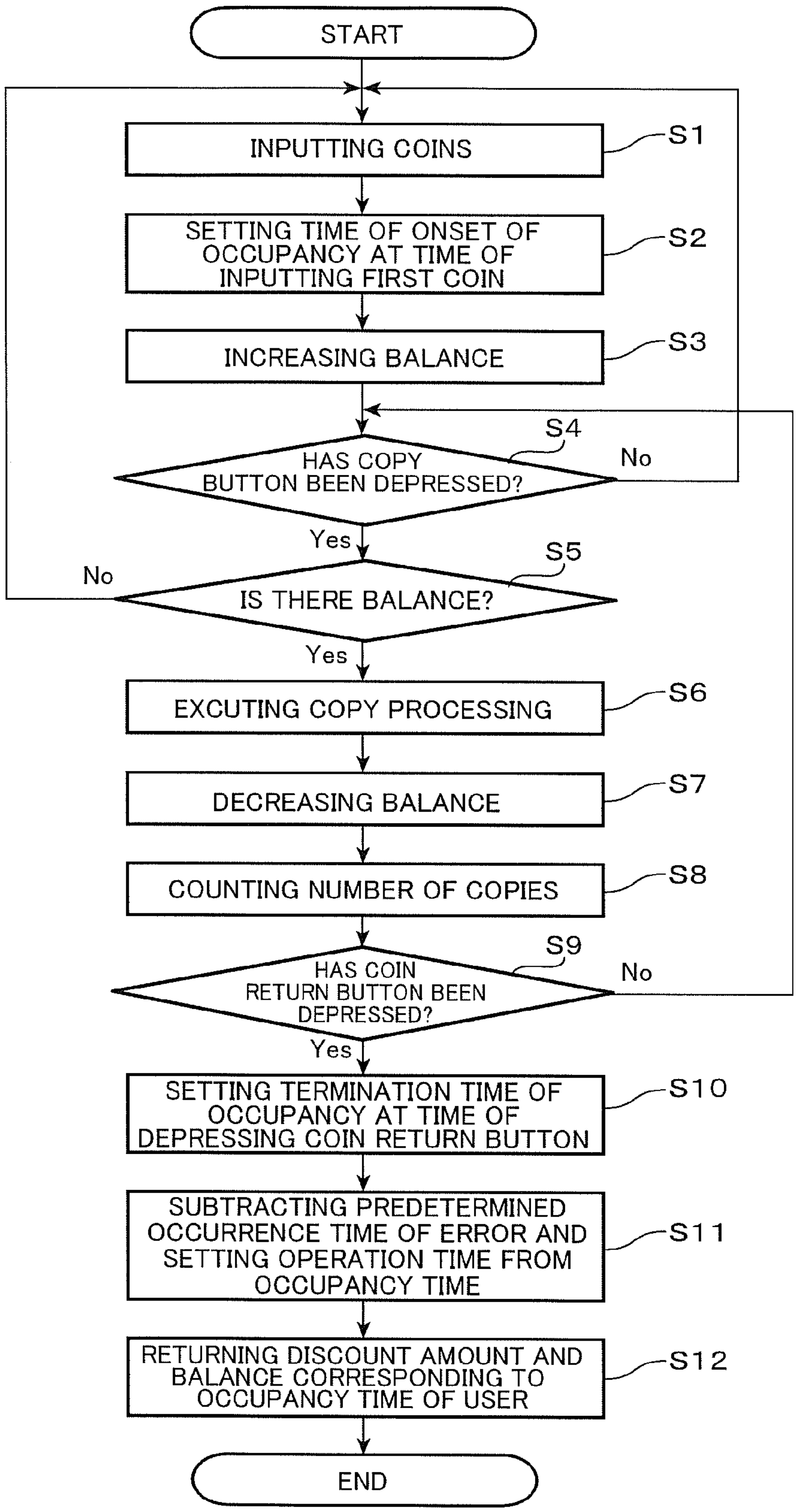
FIG. 4 shows a flowchart illustrating procedures of an accounting process.

FIG. 4 shows a flowchart illustrating the procedures of the accounting process. A copy charge in this system is set by an accounting system on the basis of the number of operations such that, for example, 10 cents are charged per copy. In this system, a message that the charge will be discounted on the basis of each occupancy time is given to the user together with the message indicative of the accounting system. By giving the messages to the user in the above mentioned manner, it becomes possible to clearly indicate to the user that the charge will be discounted on the basis of each occupancy time, thereby making the user perform a copying operation more rapidly.

Next, specific procedures will be described. First, when a user inputs a coin into a coin input slot of a coin vending machine (S1), a system control unit of an image forming device determines whether this coin inputting operation is the first coin inputting operation. In the case that it has been determined to be the first coin inputting operation, the occupancy time counting unit of the image forming device starts counting the occupancy time (S2).

Next, an accounting unit of the image forming device increases balance data stored in the coin vending machine by an amount corresponding to the amount of money corresponding to the input coins (S3). Additional coins can be input at any time, and processes S1 and S3 are repeated every time each coin is additionally input.

When a copy button is depressed by the user in this situation (S4: Yes), the accounting unit determines the presence/absence of the balance in the coin vending machine (S5). When the balance is present (S5: Yes) at this time point, a sheet supply device supplies a sheet of paper to an image generation device in the image forming device. The image generation device executes a copying process by printing an image read from an original on the supplied sheet of paper (S6). The accounting unit of the image forming device decreases balance data stored in the coin vending machine by the amount corresponding to the charge for one copy (10 cents) (S7) and counts the number of copies (S8). Processes S1 to S8 are executed repeatedly until a coin return button on the coin vending machine is depressed (S9).

When the coin return button of the coin vending machine is depressed (S9: Yes), an occupancy time counting unit terminates counting of the occupancy time (S10). The occupancy time counting unit can identify the occupancy time during which processes S2 to S10 are being executed and during which the user has exclusively used the image forming device. Upon counting the occupancy time, the occupancy time counting unit subtracts a time for which an error has occurred and a time taken to execute a setting operation from the counted occupancy time to calculate a substantial occupancy time (S11).

When the balance in the coin vending machine has been used up, the user may leave without depressing the coin return button. In this situation, discounting is applied depending on the occupancy time of the user. Therefore, it is preferable to request the user to depress the coin return button by displaying a message on a display panel or using a voice prompt.

Next, a charge discounting unit of the image forming device calculates a discount amount on the basis of the counted occupancy time and the number of copies made. The coin vending machine returns the discount amount and the balance to the user (S12). For example, in the case that the standard occupancy time per copy is set to 1 minute and the discount amount per 10 seconds is set to 1 cent, if 10 copies are made in 8 minutes, then the copying operation will be finished in a time shorter than the standard occupancy time by 120 seconds. Therefore, 12 cents will be returned to the user as the discount amount.

Next, examples of a display on the display panel on the coin vending machine will be described with reference to FIGS. 5A to 5E. FIGS. 5A to 5E show diagrams illustrating examples of display on display panel 31.

Figure 5A:
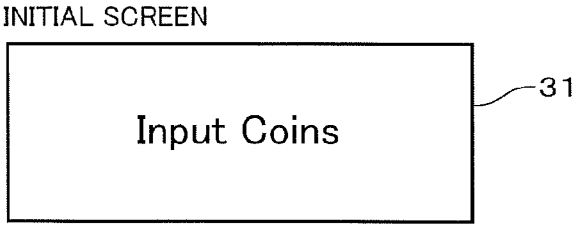
FIG. 5A shows a display example on a display panel.
Figure 5B:
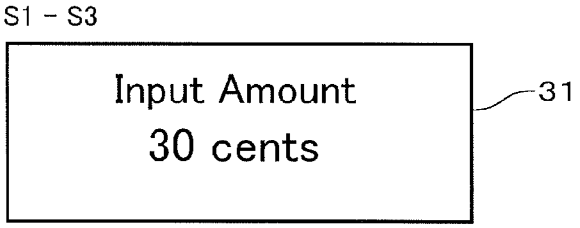
FIG. 5B shows a display example on the display panel.
Figure 5C:
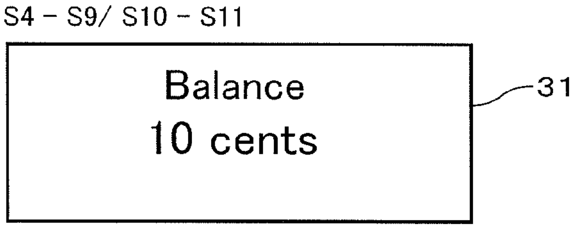
FIG. 5C shows a display example on the display panel.
Figure 5D:
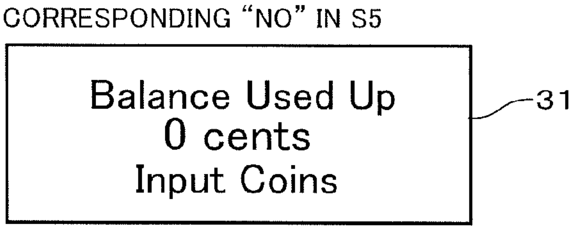
FIG. 5D shows a display example on the display panel.

As illustrated in FIG. 5A, a message such as "Input Coins" is displayed on display panel 31 of the coin vending machine as an initial screen. When coins are input into the coin vending machine in this situation (corresponding to processes S1 to S3 in FIG. 4), a message concerning an input amount of money such as "Input Amount, 30 cents" is displayed on display panel 31 as illustrated in FIG. 5B. After execution of the copying process (corresponding to processes S4 to S9 in FIG. 4), a message concerning the balance such as "Balance, 10 cents" is displayed on display panel 31 as illustrated in FIG. 5C. If the balance is used up when the copy button is depressed (corresponding "No" in process S5 in FIG. 4), a message such as "Balance Used Up, 0 cents, Input Coins" will be displayed on display panel 31 as illustrated in FIG. 5D.

Figure 5E:
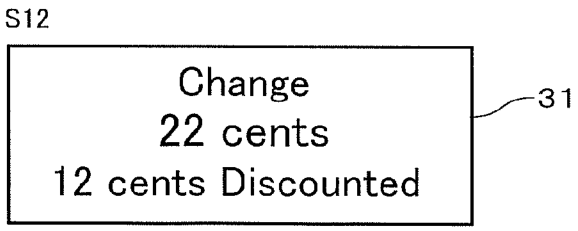
FIG. 5E shows a display example on the display panel.

When the coin return button 34 is depressed so as to return the balance and the discount amount (corresponding to process S12 in FIG. 4), a message concerning a return amount such as "Change, 22 cents, 12 cents Discounted" is displayed on display panel 31 as illustrated in FIG. 5E.

Although the accounting apparatus according to the present invention has been described above in relation to one embodiment, the present invention is not limited to the above mentioned embodiment and may be modified and varied in a variety of ways within the scope of the appended patent claims.

For example, although in the accounting apparatus according to the above mentioned embodiment, a system of charging on the basis of the number of operations is adopted, a system of charging on the basis of an operation time may be adopted instead. In addition, although in the above mentioned embodiment, coin-based accounting is adopted, bill-based or electronic-money-based accounting may be adopted instead.

Further, although in the above mentioned embodiment, the image forming device (as the accounting object device) such as the above mentioned MFP or a copy machine has been described, the accounting object device according to the present invention may be also applied to accounting-type washer and dryer systems installed at a laundromat.

Still further, although in the above mentioned embodiment, the accounting object device is combined with the coin vending machine to constitute an accounting apparatus, even a stand-alone device serving as an accounting object device or even a stand-alone coin vending machine may correspond to the accounting apparatus according to the present invention on condition that all the above mentioned accounting unit, occupancy time counting unit and charge discounting unit are present. Further, even an accounting server for executing an accounting process via a network may correspond to the accounting apparatus according to the present invention.

In part, in an embodiment, the invention may be summarized as follows.

An accounting apparatus according to an embodiment of the present invention may include an accounting unit, an occupancy time counting unit and a charge discounting unit. The accounting unit may be configured to impose a charge for use of a device that is an object of accounting on the basis of the number of operations and/or an operation time of the device. The occupancy time counting unit may be configured to count an occupancy time that a user has exclusively used the device. The charge discounting unit may be configured to discount the charge for use of the device on the basis of the counted occupancy time.

Accordingly, it becomes possible to encourage each user who uses or exclusively uses an image forming device to reduce his occupancy time, thereby increasing the use efficiency of the image forming device.

In addition to the above-mentioned configuration, the charge discounting unit may be configured to compare a standard occupancy time that has been set for the number of operations and/or the operation time of the device. The occupancy time may be counted using the occupancy time counting unit, and the charge discounting unit be configured to discount the charge for use of the device when the occupancy time is shorter than the standard occupancy time.

Furthermore, the charge discounting unit may be configured to increase or decrease a discount amount in proportion to a difference between the standard occupancy time and the counted occupancy time.

The accounting apparatus may further include a display panel that is configured to display the discount amount.

Accordingly, it becomes possible to appropriately discount the charge on the basis of the standard occupancy time and it may also become possible to further encourage each user to reduce his occupancy time, thereby further increasing the use efficiency of the image forming device.

In addition to the above-mentioned configuration, the occupancy time counting unit may be configured to subtract from the occupancy time a time during which an error has occurred in the device.

Alternatively, the occupancy time counting unit may be configured to subtract a time taken for execution of a setting operation on the device from the occupancy time.

Accordingly, even if the occupancy time of one user is increased due to occurrence of an error that is not the fault of the user, it become possible to discount the charge on the basis of his substantial occupancy time from which the error occurrence time has been subtracted.

In addition to the above-mentioned configuration, the accounting unit may be configured to (i) subtract the charge for use of the device (on the basis of the operation of the device) from an amount of money that the user has paid, (ii) to return money corresponding to the balance, in response to a balance returning operation performed by the user, and (iii) to permit the operation of the device within a range of the balance without the balance returning operation. The occupancy time counting unit may be configured to start counting the occupancy time in response to payment, and to terminate counting of the occupancy time in response to execution of the balance returning operation. The charge discounting unit may be configured to calculate a discount amount in response to the balance returning operation, and to return the money corresponding to the discount amount and the balance.

Furthermore, the payment may be performed in money and/or electronic money.

Accordingly, even if a user takes substantial time to perform an operation, such that the time for performing the operation should be omitted from the occupancy time, it becomes possible to discount the charge on the basis of his substantial occupancy time from which the time taken for the operation has been subtracted.

An accounting method according to an embodiment of the present invention may include (1) an accounting unit imposing a charge for use of a device that is an object of accounting on the basis of the number of operations and/or an operation time of the device, (2) an occupancy time counting unit counting an occupancy time that the device has been exclusively used by a user and (3) a charge discounting unit discounting the charge on the basis of the counted occupancy time.

Accordingly, it becomes possible to encourage each user who uses or exclusively uses an image forming device to reduce his occupancy time, thereby increasing the use efficiency of the image forming device.

A computer-readable recording medium according to an embodiment of the present invention stores accounting program codes to be executed by a computer installed in an accounting apparatus. The accounting program codes may include three program codes. The first program code may cause the computer to impose a charge for use of a device that is an object of accounting on the basis of the number of operations and/or an operation time of the device. The second program code may cause the computer to count an occupancy time for which the device has been exclusively used by a user. The third program code may cause the computer to discount the charge for use of the device on the basis of the counted occupancy time.

Accordingly, it can become possible to encourage each user who uses or exclusively uses an image forming device to reduce his occupancy time, thereby increasing the use efficiency of the image forming device.

As a result, an effect may be that each user is encouraged to always make a conscious effort to reduce the time taken for operation of the apparatus.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An accounting apparatus comprising:

a computer that includes a CPU, a ROM, and a RAM, the computer configured to include:

an accounting unit configured to impose a charge for use of a device that is an object of accounting on the basis of a number of operations and/or an operation time of the device;

an occupancy time counting unit configured to count an occupancy time that the device has been exclusively used by a user; and a charge discounting unit configured to discount the charge for use of the device on the basis of the counted occupancy time, wherein the occupancy time counting unit is configured to start counting of the occupancy time in response to payment and to terminate counting of the occupancy time in response to execution of a balance returning operation, the charge discounting unit is configured to compare a standard occupancy time that has been set for the number of operations and/or the operation time of the device with the occupancy time counted using the occupancy time counting unit and to discount the charge for use of the device when the occupancy time is shorter than the standard occupancy time and, the charge discounting unit is configured to increase or decrease a discount amount in proportion to a difference between the standard occupancy time and the counted occupancy time.

2. The accounting apparatus according to claim 1, further comprising a display panel configured to display the discount amount.

3. The accounting apparatus according to claim 1, wherein the occupancy time counting unit is configured to subtract a time that an error has occurred in the device from the occupancy time.

4. The accounting apparatus according to claim 1, wherein the occupancy time counting unit is configured to subtract a time taken for execution of a setting operation on the device from the occupancy time.

5. The accounting apparatus according to claim 1, wherein the accounting unit is configured to subtract the charge for use of the device on the basis of the operation of the device from an amount of money that the user has paid, and further configured to return money corresponding to a balance in response to a balance returning operation performed by the user and to permit the operation of the device within a range of the balance without the balance returning operation, and the charge discounting unit is configured to calculate a discount amount in response to the balance returning operation and to return the money corresponding to the discount amount and the balance.

6. The accounting apparatus according to claim 5, wherein the payment is performed in money and/or electronic money.

7. An accounting method executed by a computer installed in an accounting apparatus, the computer including an accounting unit, an occupancy unit, and a charge discounting unit, the method comprising:

the accounting unit imposing a charge for use of a device that is an object of accounting on the basis of a number of operations and/or an operation time of the device;

the occupancy time counting unit counting an occupancy time that the device has been exclusively used by a user, the occupancy time counting unit starts counting of the occupancy time in response to payment and terminates counting of the occupancy time in response to execution of a balance returning operation;

the charge discounting unit comparing a standard occupancy time that has been set for the number of operations and/or the operation time of the device with the occupancy time counted using the occupancy time counting unit; and the charge discounting unit discounting the charge for use of the device when the occupancy time is shorter than the standard occupancy time wherein discounting the charge for use of the device when the occupancy time is shorter than the standard occupancy time comprises increasing or decreasing a discount amount in proportion to a difference between the standard occupancy time and the counted occupancy time.

8. The method according to claim 7, wherein counting an occupancy time that the device has been exclusively used by a user comprises subtracting a time that an error has occurred in the device from the occupancy time.

9. The method according to claim 7, wherein counting an occupancy time that the device has been exclusively used by a user comprises subtracting a time taken for execution of a setting operation on the device from the occupancy time.

10. The method according to claim 7, wherein imposing a charge comprises receiving a payment, wherein the payment is money and/or electronic money.

11. A non-transitory computer-readable recording medium that stores accounting program codes to be executed by a computer installed in an accounting apparatus, the accounting program codes comprising:

a first program code for causing the computer to impose a charge for use of a device that is an object of accounting on the basis of a number of operations and/or an operation time of the device;

a second program code for causing the computer to count an occupancy time that the device has been exclusively used by a user; and a third program code for causing the computer to discount the charge for use of the device on the basis of the counted occupancy time, wherein the second program code further causes the computer to start counting of the occupancy time in response to payment and to terminate counting of the occupancy time in response to execution of a balance returning operation, the third program code further causes the computer to compare a standard occupancy time that has been set for the number of operations and/or the operation time of the device with the occupancy time counted using the occupancy time counting unit and to discount the charge for use of the device when the occupancy time is shorter than the standard occupancy time, and the third program code further causes the computer to increase or decrease a discount amount in proportion to a difference between the standard occupancy time and the counted occupancy time.

12. The non-transitory computer-readable recording medium according to claim 11, wherein the second program code further causes the computer to subtract a time that an error has occurred in the device from the occupancy time.

13. The non-transitory computer-readable recording medium according to claim 11, wherein the second program code further causes the computer to subtract a time taken for execution of a setting operation on the device from the occupancy time.

14. The non-transitory computer-readable recording medium according to claim 11, wherein the first program code further causes the computer to receive a payment, wherein the payment is money and/or electronic money.

* * * * *